UNITED STATES PATENT OFFICE.

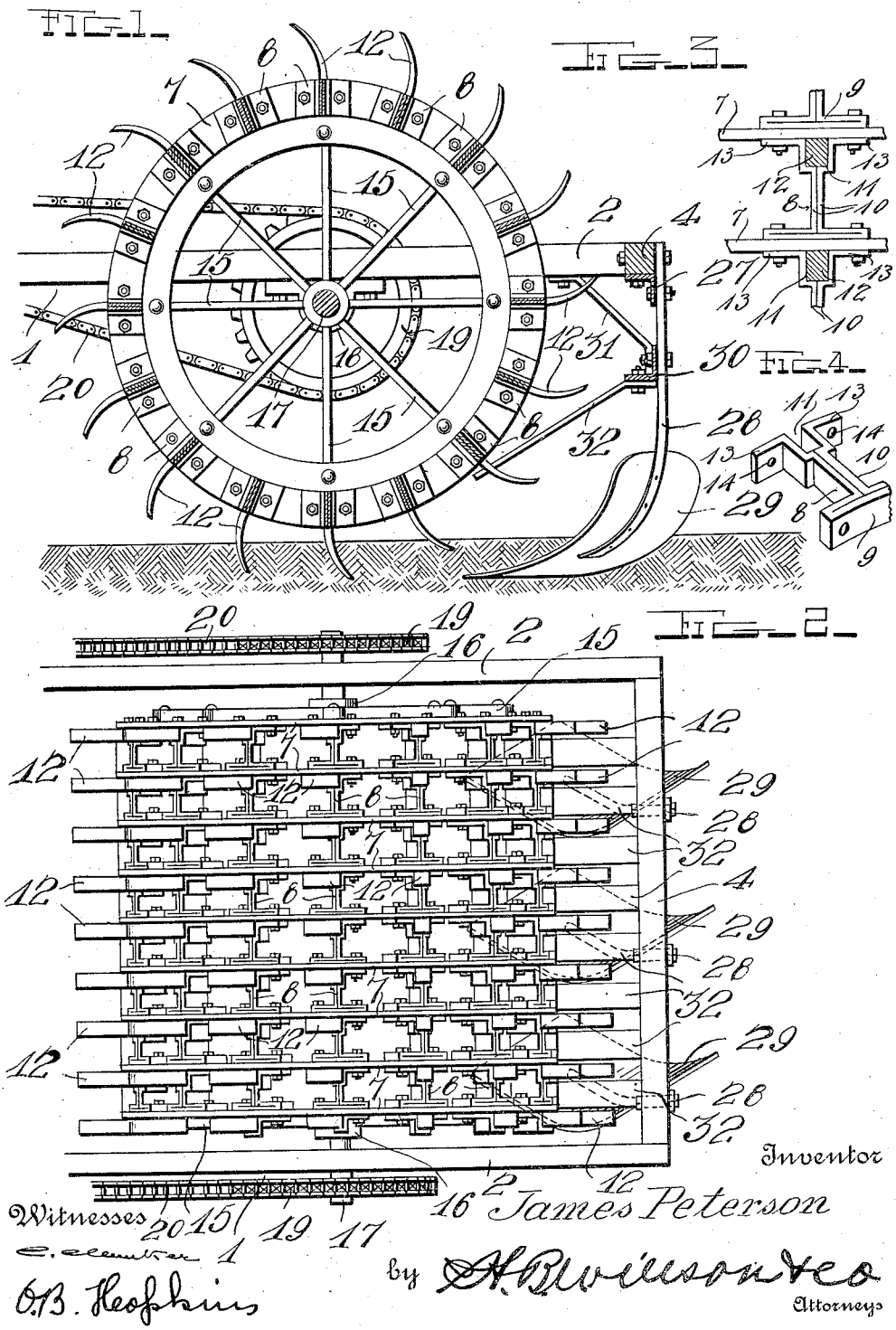

JAMES PETERSON, OF AMERICAN FORK, UTAH.

ROTARY PLOW.

1,030,489.  Specification of Letters Patent.  Patented June 25, 1912.

Application filed February 18, 1911. Serial No. 609,353.

*To all whom it may concern:*

Be it known that I, JAMES PETERSON, a citizen of the United States, residing at American Fork, in the county of Utah and State of Utah, have invented certain new and useful Improvements in Rotary Plows; and I do declare the following to be a full, clear, and exact description of the invention, such as will enable others skilled in the art to which it appertains to make and use the same.

This invention relates to rotary plows and has for its object to provide plows of this character with improved means for mounting and supporting the digging mechanism.

With this object in view the invention consists in the improved construction, arrangement and combination of the parts of a plow of this character, which will be hereinafter fully described and afterward specifically claimed.

In the accompanying drawings:—Figure 1 is a longitudinal vertical section through the part of a rotary plow which contains my improvements; the drive-chain being broken off; Fig. 2 is a plan view of the parts shown in Fig. 1; Fig. 3 is a detail view showing part of the supporting means for the rotary plowing teeth; Fig. 4 is an enlarged detail view of one of the spacing and holding frames for the rotary teeth.

Referring more particularly to the drawings, 1 denotes the supporting frame of the machine, preferably of rectangular form and comprising longitudinal side bars 2, which are connected at their forward ends by a front cross bar not shown and at their rear ends by a rear cross bar 4. The forward portion of the frame 1 is provided with supporting wheels not shown which are revolubly mounted on an axle not shown secured to the frame in any suitable manner.

Revolubly mounted in the rear portion of the frame 1 is a rotary digging mechanism comprising a series of flat rings 7 arranged in parallel relation and spaced equal distances apart as shown. The rings 7 are secured together and spaced apart by a plurality of series of combined spacing and teeth supporting frames 8 each preferably formed from a single strip or flat metal bar which is bent midway its ends to form a flattened loop 9. The ends of the bar after forming the loop 9, are brought together and bent at right angles to the center of the loop to form spacing members 10. The ends after forming the members 10 are bent laterally at right angles and then longitudinally to form a blade or tooth receiving socket 11 which is adapted to receive and support one of the teeth or digging blades 12 hereinafter more fully described. After forming the sockets 11 the ends of the bars are bent outwardly at right angles and in opposite directions to form attaching flanges 13. In the flanges 13 and the ends of the flattened loop 9 are formed apertures 14 through which, and through the rings 7, are inserted fastening bolts, whereby the rings are securely held in position by said frames 8.

It will be observed that each frame 8 is substantially of T-shape, the head being formed of the flattened loop 9, the stem being the spacing members 10, and the base being the flanges 13, the sockets 11 being formed at the junction of the stem and base. The frames are arranged in line and in parallel rows on the rings 7, said rows being spaced suitable distances apart to support the desired number of teeth or plows 12, one of which is inserted in the socket 11 of each of the frames 8 and clamped by the bolts 14 against the adjacent side of one of the rings, thereby firmly holding said teeth or plows in position to engage the ground when the rings are turned. The teeth 12 are preferably in the form of flat blades the outer portions of which are curved slightly as shown.

Secured at their outer ends to each of the outer rings 7 are radial spokes 15 the inner ends of which are connected to hubs 16 fixed on a shaft 17 which is revolubly mounted in suitable bearings 18 secured to the side bars 2 of the frame.

On the outer ends of the shaft 17 are fixed, sprocket gears 19, which may be connected, by sprocket chains 20, to suitable sprocket gears (not shown) on a suitable motor (not shown) whereby the machine may be motor driven.

To the lower side of the rear cross bar 4 is secured an angle iron bar 27 to which and to the rear cross bar 4 are bolted a plurality of plow standards 28 on the lower ends of which are secured turning blades or plow shares 29 which engage the soil after being dug up and loosened by the digging teeth or blades 12, said plows turning the soil over in the manner of an ordinary plow. To the standards 28 of the plow shares 29 is bolted a transversely disposed scraper supporting bar 30 the ends of which are connected by braces 31 to the adjacent portions of the side bars 2 of the machine. To the bar 30 are bolted a plurality of forwardly projecting downwardly inclined scraping bars or blades 32 which are arranged in parallel relation and spaced a suitable distance apart to permit the passage of the digging teeth or blades as the latter are brought upwardly after leaving the soil. In thus passing between the scraping bars or plates 32 any earth or debris which may adhere to or be pulled up by the teeth will be scraped off and the latter effectually cleaned so that when again brought into engagement with the ground the teeth will not be deterred from readily entering the soil by any adhering obstructions.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a plow of the character described, a supporting frame, a rotary digging mechanism revolubly mounted therein, said mechanism comprising a series of rings, combined fastening and tooth holding devices adapted to be secured to said rings whereby the latter are spaced apart and fastened together, said devices each being of substantially T-shape, the head being secured to one ring, the stem forming a spacing member and extending toward the next adjacent ring, the base flanges extending laterally from the stem and being secured to said next adjacent ring, and the junction between the stem and base flanges being formed into a socket to receive a digging tooth.

2. In a plow of the character described, a supporting frame, a rotary digging mechanism revolubly mounted therein, said mechanism comprising a series of rings, combined fastening and tooth holding devices adapted to be secured to said rings whereby the latter are spaced apart and fastened together, said devices comprising frames formed from flat metal strips bent midway between their ends to form a transverse flattened loop, said ends being bent at right angles to said loop, said right angular portions of the ends being again bent to form tooth receiving sockets and laterally projecting lugs said lugs and the flat loops at the opposite ends of the frames having formed therein bolt holes adapted to receive fastening bolts whereby said parts are bolted to said rings, and digging teeth secured in the sockets of said frames.

In testimony whereof I have hereunto set my hand in presence of two subscribing witnesses.

JAMES PETERSON.

Witnesses:
L. O. HILTON,
O. B. HOPKINS.

---

Copies of this patent may be obtained for five cents each, by addressing the "Commissioner of Patents, Washington, D. C."